Figure 1:
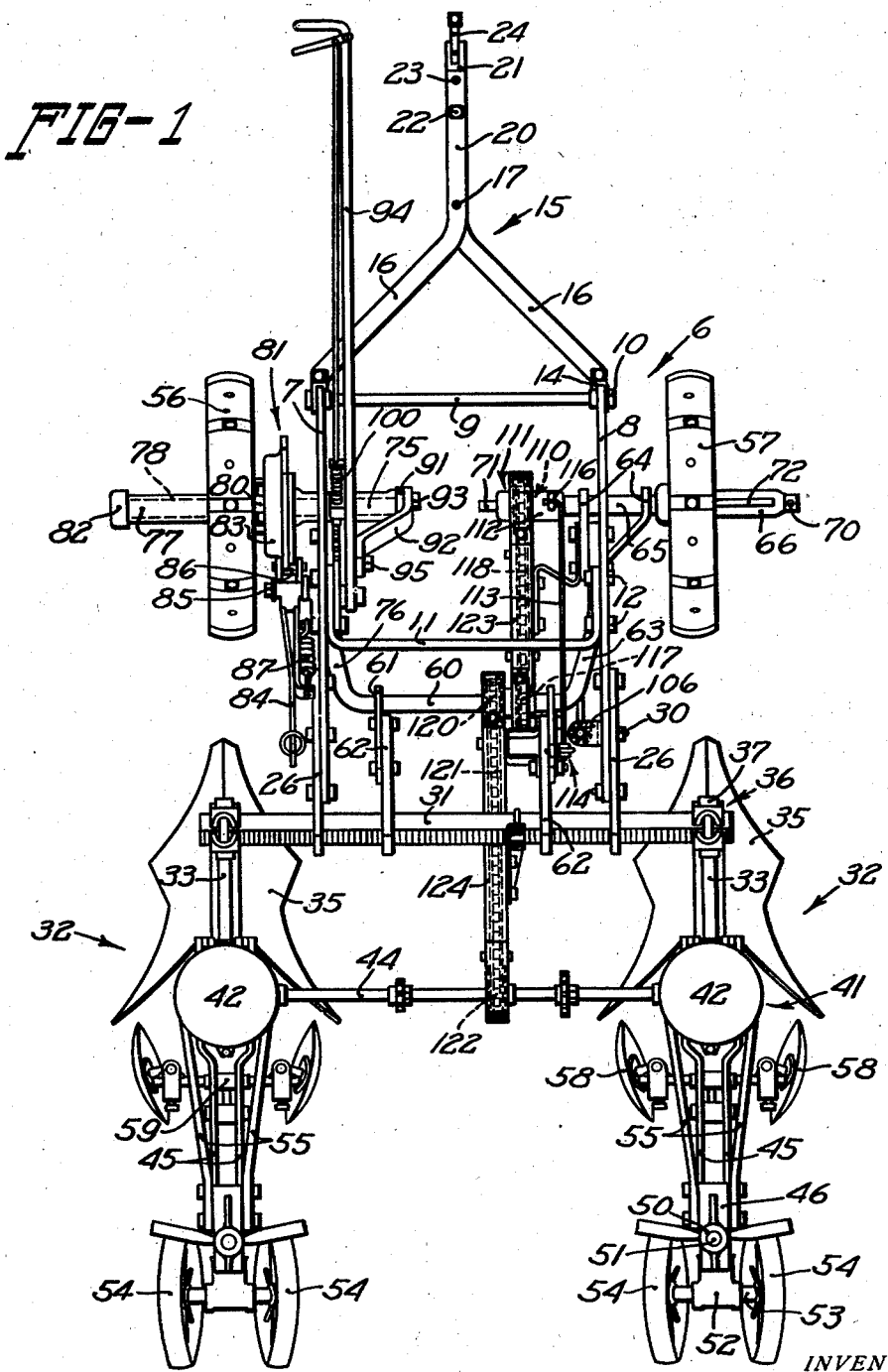

Nov. 25, 1941.  W. H. SILVER  2,263,652
LISTER
Filed Jan. 3, 1938  3 Sheets-Sheet 1

INVENTOR
WALTER H. SILVER
BY
ATTORNEYS

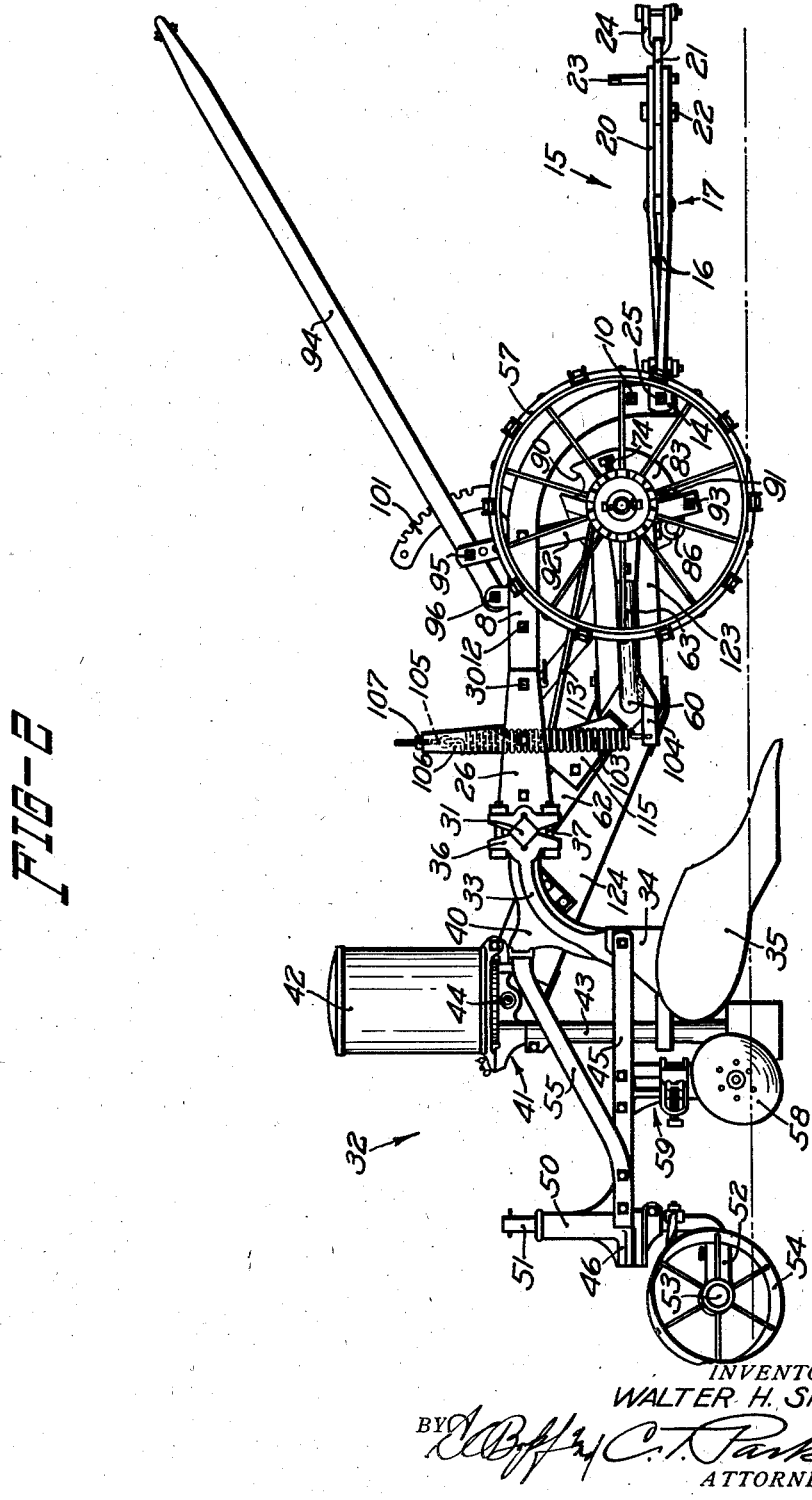

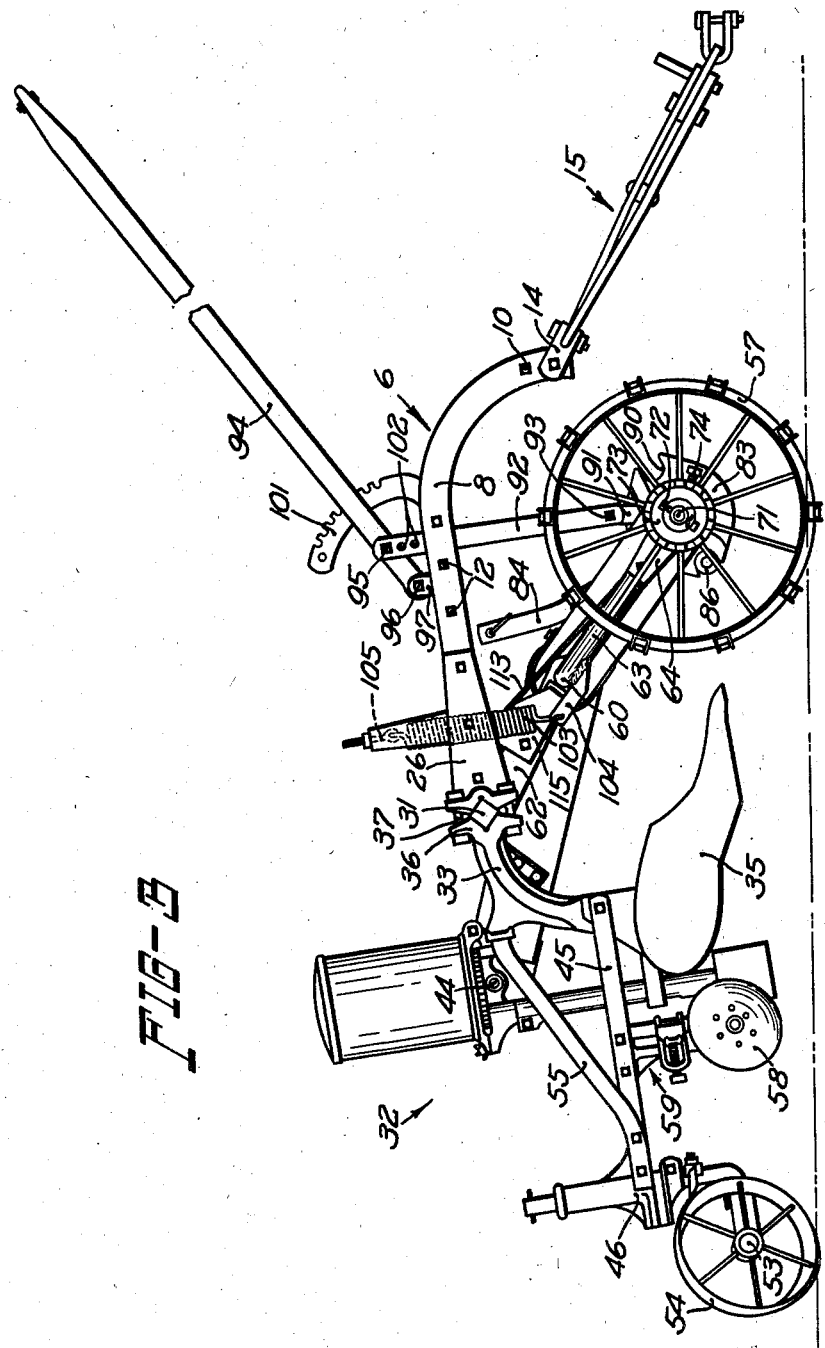

Patented Nov. 25, 1941

2,263,652

UNITED STATES PATENT OFFICE 2,263,652

LISTER

Walter H. Silver, Moline, Ill., assignor to Deere & Company, Moline, Ill., a corporation of Illinois Application January 3, 1938, Serial No. 183,054

11 Claims. (Cl. 111—69)

The present invention relates to agricultural implements and more specifically to wheel supported two row listers or planters.

The principal object of the present invention is to provide an improved two row lister of the type adapted to be towed behind a tractor or other source of tractive power, which is quickly and easily adjustable for a variety of row spacings.

Another object is the provision of a planter in which a substantial portion of the weight is carried by the press wheels both in operative and transport positions thereby relieving the frame and draft connections of excessive stresses.

Another object of the present invention is to provide a planter of the type having planting units which are adjustably connected to the frame, and press wheels which are adjustable with the planting units.

More specifically a further object relates to the provision of a lister in which each ground working tool, planting mechanism, and press wheels comprise a unitary structure which is laterally shiftable on the lister frame.

Still another object is to provide a planter having supporting wheels which are adapted to be positioned immediately ahead of the tools for accurately controlled gauging of the working depth of the latter.

These and other objects and advantages of the present invention will become apparent after consideration of the following detailed description of a preferred embodiment together with the appended drawings, in which Figure 1 is a plan view of a two row lister planter embodying the principles of the present invention;

Figure 2 is a side elevation of the planter shown in Figure 1, showing the implement in operative position; and Figure 3 is a view similar to that in Figure 2, with the implement shown in transport position.

Referring now to the drawings, the implement frame, indicated in its entirety by the reference numeral 6, comprises a pair of spaced fore and aft extending beams 7 and 8, the forward ends of which are curved downwardly and connected together by a transverse frame member 9 to which they are bolted by bolts 10. Disposed rearwardly of the member 9 is a second transverse member 11, the ends of which are bent forwardly and fixed to the beams 7, 8 by bolts 12. Pivotally connected by links 14 to the front ends of the beams 7, 8 for vertical swinging is a draft frame 15 comprising a pair of forwardly converging members 16 which are connected together at 17 and extend forwardly therefrom in parallel, vertically spaced relation to form a draft tongue 20. A bar 21 is inserted between the ends of the members 16 and rigidly secured thereto by means of a bolt 22 and pin 23 which are passed through aligned holes in the three members. A clevis 24 which engages an aperture in the bar 21 provides hitch means for connecting the draft frame to a tractor drawbar or other suitable source of tractive power. The links 14 are connected to the ends of the beams 7, 8 by pivot bolts 25.

Carried at the rear end of the frame 6 in two bracket members 26 which are fixed to the ends of the beams 7, 8 by bolts 30, is a transverse tool bar 31 of uniform square cross section. Preferably, the tool bar 31 is passed through and welded to sockets formed in the ends of the brackets 26.

Clamped to the transverse tool bar 31 near opposite ends thereof are two planter units, each indicated in its entirety by the reference numeral 32, and each comprising a downwardly and rearwardly curved tool shank 33, the bottom end of which is fixed to the frog 34 of a lister bottom 35. The front end of the tool shank 33 is provided with a clamp 36 which is adapted to engage the tool bar 31 and is clamped in position by two bolts 37. A bracket 40, preferably formed integrally with the tool shank 33 on the back side thereof, provides a support to which planting mechanism is fixed in a manner well known to those skilled in the art. The planting mechanism for each unit 32 comprises a seed can 42, in the base of which is disposed seed dropping mechanism 41 driven by a transverse drive shaft 44, together with a spout 43 which conveys the seed down into the furrow immediately behind the lister bottom 35. The drive shaft 44 is adapted to accommodate any spacing of the planter units 32 and is operatively connected with the right supporting wheel by power transmission means to be described hereinafter.

Disposed behind the tool shank 33 is a press wheel supporting frame comprising a pair of laterally spaced beams 45 which are fixed on opposite sides of the frog 34 and extend rearwardly therefrom. The rear ends of the beams 45 are bolted to a wheel housing 46 which includes a vertical sleeve 50. Journaled within the sleeve 50 is a post 51, the lower end of which is bent rearwardly and engaged by an axle housing 52. A pair of stub axles 53 extend laterally from the housing 52, and journaled on each axle is a press wheel 54. The caster action thus imparted to the press wheels 54 by the swiveled axle post 51 enables the press wheels to follow the lister bottoms freely regardless of the irregularity of the furrow formed thereby. A pair of struts 55 are bolted to the wheel housing 46 with the beams 45 and extend forwardly and upwardly in slightly diverging relation to the bracket 40 to which they are fixed, providing vertical bracing for the press wheel supporting frame. A pair of covering disk shovels 58 disposed immediately behind the spout 43 are carried on a suitable frame 59 which is bolted to the beams 45.

The frame 6 is supported on two laterally spaced wheels 56 and 57 which are carried at the ends of a bail member 60. The transverse portion of the bail 60 is journaled in a pair of laterally spaced bearing plates 61 which are bolted to bracket members 62. The latter are apertured to receive the tool bar 31 to which they are welded, and extend downwardly and forwardly therefrom. Fixed to the end of the right arm 63 of the bail 60 are two diverging bracket members 64, the ends of which are apertured to receive a transverse pipe 65, and the latter is welded to the bracket members. A sleeve 66 embraces the outer end of the pipe 65 and is journaled thereon, while pinned to the sleeve at 70 is a shaft 71 which is journaled within the pipe 65, extending inwardly the length of the pipe and projecting a short distance beyond the inner end thereof. The wheel 57 is laterally shiftable relative to the sleeve 66 and non-rotatably secured thereon, preferably by means of keys 72 formed on the sleeve 66 which are engaged by companionate keyways formed in the hub 73 of the wheel 57. A set screw 74, which is in threaded engagement with the hub 73, holds the wheel against axial displacement on the sleeve.

The left wheel 56 is carried at the end of the other bail arm 76 in an axial housing which includes a transverse tubular portion 75. Journaled within the tube 75 is a shaft 78, one end of which projects laterally outward from the outer end of the tube 75 and the other end of which projects a short distance from the inner end of the tube. A sleeve 77 is journaled on the projecting end of the shaft 78 and is fixed at its inner end to the driving member 80 of a clutch 81. The wheel 56 is non-rotatably secured to the sleeve 77 and laterally shiftable thereon in the same manner as is the wheel 57 on its respective sleeve 66. A cap 82 is fixed to the sleeve 77 and covers the ends of the sleeve and shaft 78, preventing the entrance of dirt or foreign material into the bearing surfaces.

The bail member 60 is swung downwardly and the implement lifted thereby through the agency of the clutch 81 acting against the beam 7 through suitable linkage, as will now be disclosed. The clutch 81 is a conventional self-interrupting, half-revolution clutch, the principle and operation of which are well known to those skilled in the art, and inasmuch as the details of the clutch have no bearing on the present invention, it is deemed sufficient to state that there is a driving member 80 which is fixed to the sleeve 77, a normally non-rotating driven member 83 which is fixed to the shaft 78, means disposed within the clutch and carried on the driven member 83 for engaging the driving and driven members and automatically disengaging them after one-half revolution, and actuating means for initiating the operation of the engaging means. In the embodiment shown and described herein, the actuating means comprise a trip lever 84 which is pivotally connected to the arm 76 of the bail member 60 at 85 and is bifurcated at its lower end to carry a roller 86. A spring 87 is anchored at one end to the left bail arm 76 and connected at the other end to a bracket formed on the trip lever 84, holding the roller 86 under tension against the periphery of the driven member 83 and normally in seated engagement with one of two recesses 90 formed therein at 180 degrees spacing. When the trip lever 84 is pulled forward, lifting the roller out of the recess 90, the engaging means are actuated and the driven member 83 is rotated through one-half revolution, bringing the other of the two recesses 90 into register with the roller 86. As the roller drops into the second recess, the driving and driven members are disengaged and the driven member 83 is again held rigidly against rotation. A crank arm 91 is fixed to the inner end of the shaft 78 in any suitable manner, preferably by welding, and is so positioned that when the clutch 81 is disengaged the crank arm 91 extends either upwardly as in Figure 3, or downwardly as in Figure 2. Lifting force exerted by the clutch 81 is transmitted to the frame 6 through a link 92, one end of which is swingably connected by a pivot bolt 93 to the crank arm 91 and the other end of which is connected by a pivot bolt 95 to a depth adjusting hand lever 94. The latter is swingably connected by a pivot bolt 96 to a lug 97 which is fixed to the beam 7, and extends forwardly and upwardly to within reach of the operator controlling the tractor or other source of tractive power to which the implement is attached. The lever 94 is adjustably locked into position by means of conventional latch mechanism 100 which engages a notched sector 101 fixed to the beam 7. Thus, when the lever 84 is tripped, engaging the clutch 81, the crank arm 91 is rotated 180 degrees to raise or lower the frame 6 between operative and inoperative positions through the agency of the link 92. As the implement is supported at both the front and rear ends, but is raised on the front wheels only, the frame is tilted upwardly about the rear supporting wheels 54 as a fulcrum and the planting mechanism which is disposed intermediate the ends is lifted clear of the ground. The working depth of the tools is adjusted by locking the lever 94 in the proper notch on the sector 101, and the range of adjustability is further increased by additional perforations 102 in the link 92 which permit connection of the link to the lever 94 in any of several positions. The traction driven clutch 81 is assisted in lifting the weight of the implement by a counterbalancing tension spring 103, one end of which is connected to a lever arm 104 fixed to the bail arm 63 and extending rearwardly of the axis of rotation thereof. The other end of the spring 103 is engaged in the eye of an eye bolt 105 which is held in the overhanging portion of an upstanding bracket member 106 fixed to the beam 8. A nut 107 holds the eye bolt 105 securely in place. When the implement is in operative position, as shown in Figure 2, the spring 103 is stretched, and the energy thus stored in the stretched spring aids materially in overcoming the inertia of the implement and in swinging the bail arms downwardly to the transport position illustrated in Figure 3.

The planting mechanism of the two planter units 32 is driven from the right wheel 57, and to this end a sprocket, indicated at 110, is journaled on the inner end of the axle shaft 71 and adapted to be operatively connected therewith by a throw-out clutch 111. The latter is of conventional design, generally comprising a pair of normally non-rotating co-acting cam elements, one of which is operatively connected with a sleeve 112 and actuated thereby when the sleeve is turned through a small angle. The action of the cam elements effects engagement of a driving member which is fixed to the axle shaft 71 with a driven member which is fixed to the sprocket 110. The sleeve 112 is turned when the frame 6 is lifted, by means of a link 113 which is swingably connected at 114 to a plate 115 bolted to one of the bracket members 62. The other end of the link 113 is swingably connected to an arm 116 (see Figure 1) which is fixed to the sleeve 112 and extends upwardly therefrom. When the bail 60 is swung downwardly the forward end of the link 113 moves backward relative to the forward end of the arm 63, causing the sleeve 112 to turn in the opposite direction to the rotation of the bail to disconnect the sprocket 110 from the axle shaft 71. A chain 118 connects the sprocket 110 to an intermediate sprocket 117 which is journaled on the transverse portion of the bail 60. A second sprocket 120 formed integrally with the sprocket 117 is operatively connected by a chain 121 to a sprocket 122 which is fixed to the drive shaft 44. Thus, as long as the implement is in operative position, the drive shaft 44 is driven by the wheel 57 at a speed directly proportional to that of the wheel and at a ratio determined by the diameters of the various sprockets in the system. Chain guards 123 and 124 shield the sprockets and chains from dirt or other foreign material.

From the foregoing description it will be seen that the implement shown and described herein is adapted to accommodate a wide variety of conditions. On flat, cleared ground, or when relisting, the planter units may be set for any spacing within the range of the tool bar, and the wheels 56, 57 shifted to a position directly ahead of the lister bottoms 35. In this position the lister bottoms are gauged to their working depth against the level of the ground immediately ahead of the bottoms without the necessity of separate gauge wheels as is the case when outboard supporting wheels are used. Another advantage in using closely set supporting wheels is that leveling devices are not required, inasmuch as the furrowward wheel runs on the same ground level as does the landward wheel instead of in the last furrow formed. If it is desired to miss a row of stalks when working under trashy conditions, either or both wheels 56, 57 may be set out a few inches from the line of the lister bottoms without materially affecting the gauging of the working depth.

By utilizing the press wheels 54 to support a substantial portion of the weight of the implement, particularly when in transport, the frame and draft connections are relieved of much of the strain which is otherwise imposed when the overhanging planting mechanism and press wheels are lifted free of the ground for transport. Being an integral part of the planter unit 32, the press wheels and supporting structure are always maintained in longitudinal alignment with the lister bottoms, and when the latter are shifted laterally on the tool bar 31 the press wheels are also shifted with them, thereby eliminating the necessity for separate adjustments each time the row spacing is changed.

What I claim as my invention is:

1. An implement comprising, in combination, a main frame, supporting wheels disposed at the sides thereof, means connecting said wheels to said frame for vertical swinging movement, a generally transversely disposed tool holding member, a plurality of earth working tools attached to said tool holding member for lateral adjustment relative thereto, planting mechanism associated with each of said tools, a secondary frame fixedly attached to each of said earth working tools and extending rearwardly therefrom, rear support wheel means swiveled in said secondary frames behind said planting mechanism, lifting mechanism operatively connected with one of said supporting wheels to tilt said main frame and attached secondary frames upwardly about said rear support means as an axis, and power transmitting means operatively connected with the other of said supporting wheels to drive said planting mechanisms.

2. An implement comprising, in combination, a frame, a bail member connected to said frame for swinging about a transverse axis, a pair of ground wheels journaled in the ends of said bail member and shiftable laterally relative to said frame, a transverse tool bar, a pair of earth working tools adapted to be secured to said tool bar and laterally shiftable thereon, said tools being normally positioned to the rear of and substantially in alignment with said ground wheels, planting mechanism associated with each of said tools, a beam structure rigidly attached to each of said tools and extending rearwardly thereof, caster wheel means carried on each of said beam structures and disposed behind said planting mechanism, self-interrupting clutch means carried on one end of said bail member and operatively connected with the associated ground wheel, adjustable link means connecting said clutch means with said frame whereby the latter is raised by operation of the clutch, and power transmission means connecting the other of said ground wheels with said planting mechanisms to actuate the latter.

3. An implement comprising, in combination, a frame, a pair of crank arms connected to said frame for vertical swinging movement, transversely disposed axle means carried in the ends of said crank arms, a pair of ground wheels rotatably supported on said axle means and shiftable laterally thereon, a transverse tool bar of uniform square cross section rigidly supported on said frame, a pair of tool shanks having ground working tools fixed to the lower ends thereof, ground engaging support means fixed to each of said tool shanks and disposed to the rear of the tool, planting mechanism carried by each of said tool shanks, clamping means shiftable laterally along said tool bar and adapted to cooperate therewith for clamping said tool shanks and attached support means and planting mechanism to the tool bar in fore and aft alignment with said ground wheels in any position of the latter, power lift means actuated from one of said ground wheels for swinging said crank arms downwardly to raise the frame about said support means as an axis, and means for driving both of said planting mechanisms from the other ground wheel.

4. An implement comprising a frame, a bail member connected to said frame for swinging about a transverse axis, axle means carried in the ends of said bail member, a pair of ground wheels rotatably supported on said axle means and adjustable laterally thereon, a transverse tool bar of uniform square cross section fixed to said frame at the rear end thereof, a pair of planter units, each comprising a tool shank, a furrow forming tool carried at the lower end thereof, seed dropping mechanism carried on the tool shanks, and press wheels supported on the tool shanks so as to operate in the furrow formed by said tool to the rear of said seed dropping mechanism, clamping means comprising a pair of mating clamp members adapted to cooperate with said square tool bar at any point along the length thereof for rigidly connecting said planter units to the tool bar, said planter units being normally positioned in fore and aft alignment with said ground wheels, traction operated power lift mechanism for raising the front end of said frame about said press wheels as a pivot, and means actuated by one of said ground wheels for driving said seed dropping mechanism.

5. In an implement, the combination of a wheel supported frame comprising a pair of longitudinally extending bars and a transverse tool bar rigidly fixed to the rear ends of said longitudinal bars and extending laterally outwardly therefrom, a pair of crank axles having laterally outwardly extending wheel receiving ends, ground wheels mounted on said ends of the crank axles laterally outwardly of said longitudinal frame bars, bracket means extending downwardly below said longitudinal frame bars and pivotally receiving the upper ends of said crank axles, a pair of tool shanks, each having a ground working tool fixed to the lower end thereof and planting means connected therewith, ground engaging support means fixed to each of said tool shanks and disposed to the rear of the associated planting means, means fixing said tool shanks to said tool bar laterally outwardly of said longitudinal frame bars in approximate fore and aft alignment with said ground wheels, a transverse seeding shaft for driving both of said planting mechanisms, means for driving said transverse seeding shaft from one of said ground wheels, including a part rotatable closely adjacent the axis of pivotal connection between said crank axles and said brackets and a connection extending therefrom underneath said transverse tool bar to said seeding shaft, and means acting against said crank axles for raising the front end of said frame relative to said ground wheels and tilting the frame upwardly about said ground engaging support means as an axis.

6. In an implement, the combination of a frame comprising a pair of generally longitudinally extending frame bars and a transverse tool bar secured to the rear ends of said frame bars and extending laterally outwardly from said frame bars at opposite sides of the frame, a pair of laterally spaced ground wheels, a generally U-shaped bail member having outturned ends and an intermediate portion, said intermediate portion being disposed between said longitudinally extending frame bars of said frame and said bail member being connected to the frame for relative swinging movement generally below said frame bars with said outturned ends disposed laterally outwardly of said frame bars, means for mounting said wheels on the laterally outturned ends of said bail laterally outwardly of said frame bars, a pair of tool shanks having ground working tools fixed to the lower ends thereof, ground engaging support means fixed to each of said tool shanks and disposed to the rear of said tools, clamping means slidable laterally along said tool bar and adapted to cooperate therewith for clamping said tool shanks and said ground engaging support means to the laterally outer ends of the tool bar laterally outwardly of said frame bars in fore and aft alignment with said ground wheels, an arm fixed to the intermediate portion of said bail, a bracket carried by said frame generally above said intermediate portion of the bail, a counterbalancing spring connected between said arm and said bracket, and means acting against said bail for raising the front end of said frame relative to said ground wheels and tilting the frame upwardly about said ground engaging support means as an axis.

7. In a ground working implement of the type having a transverse tool bar along which working tools may be positioned depending in number upon the number of the rows to be covered, carrying wheels and means for connecting the same to the tool bar, and means for maintaining each of the wheels in different positions along a plane parallel to the tool bar on the connecting means to adapt the carrying wheels for the different settings of the working tools on the tool bar.

8. In a ground working implement of the type having a transverse tool bar along which a plurality of working tools may be positioned depending in number upon the number and spacing of rows to be covered, carrying wheels, and an extended axle means for each of the carrying wheels adapted to hold the wheels in a plurality of positions depending upon the number and spacing of working tools on the tool bar.

9. In a ground working implement, a frame adapted to have working tools connected thereto in a plurality of positions depending upon the number and spacing of rows to be covered, carrying wheels, and an extended axle means for each of the carrying wheels adapted to hold the wheels in a plurality of positions depending upon the number and spacing of working tools on the tool bar.

10. In an implement, the combination of a frame comprising a pair of generally longitudinally extending frame bars and a transverse tool bar secured to the rear ends of said frame bars and extending laterally outwardly from said frame bars at opposite sides of the frame, a pair of laterally spaced ground wheels, a generally U-shaped bail member having outturned ends and an intermediate portion, said intermediate portion being disposed between said longitudinally extending frame bars of said frame and said bail member being connected to said frame for relative swinging movement below said frame bars with said outturned ends disposed laterally outwardly of said frame bars, means for mounting said wheels on the laterally outturned ends of said bail member laterally outwardly of said frame bars, a pair of tool shanks having ground working tools fixed to the lower ends thereof, ground engaging support means fixed to each of said tool shanks and disposed to the rear of said tools, clamping means slidable laterally along said tool bar and adapted to cooperate therewith for clamping said tool shanks to the laterally outer ends of the tool bar laterally outwardly of said frame bars in fore and aft alignment with said ground wheels, and means acting against said bail member for raising the front end of said frame relative to said ground wheels and tilting the frame upwardly about said support means as an axis.

11. The combination set forth in claim 10, further characterized by a pair of brackets pivotally receiving the intermediate portion of said bail member and disposed between said pair of spaced longitudinally extending frame bars, and means connecting upper portions of said brackets to said transverse tool bar at points laterally inwardly of said frame bars.

WALTER H. SILVER.